Patented Dec. 30, 1924.

1,520,891

UNITED STATES PATENT OFFICE.

CHARLES H. SPURWAY, OF LANSING, MICHIGAN.

SOIL-TESTING MEANS AND PROCESS OF APPLYING AND USING THE SAME.

No Drawing.  Application filed January 30, 1923. Serial No. 615,916.

*To all whom it may concern:*

Be it known that I, CHARLES H. SPURWAY, a citizen of the United States, residing at the city of Lansing, county of Ingham, State of Michigan, have invented certain new and useful Improvements in Soil-Testing Means and Processes of Applying and Using the Same, of which the following is a specification.

This invention relates to an improved soil testing means and the process of applying and using the same.

Recent soil investigations show that the reaction (alkalinity, neutrality and acidity) of soils may be explained on the same chemical basis as the reaction of other substances. The reaction of soils depends on the proportion of hydrogen ions (H+) and hydroxyl ions (OH−) which soils give to their water solutions. The cause of soil alkalinity (sweet soil) is the presence of hydroxyl ions. The cause of soil acidity (sour soil) is the presence of hydrogen ions.

Considered from a chemical standpoint, soils are amphoteric in their action: that is, when soils are in contact with water, they dissociate and produce both hydrogen ions and hydroxyl ions. When these ions are equal in concentration in the soil solution, the soil reaction is neutral (neither alkaline nor acid). The soil reaction is alkaline when the hydroxyl ions are in excess in the soil solution, and acid when the hydrogen ions are in excess. The strength or degree of soil alkalinity or acidity depends on the quantity of these respective ions in excess in the soil solution. A chemical test for soil reaction should be based on the foregoing conditions and show the relationship between concentrations of hydroxyl and hydrogen ions.

This basis of test is highly accurate and indicative of true conditions. It is an object of my invention, first, to provide an accurate and practical method of determining the reaction of soils.

Second, to provide such a means based on the color changes produced by various concentrations of hydroxyl and hydrogen ions in an indicator solution for comparison with suitable standards, such as a color chart.

Third, to provide such an indicator solution which is adjusted for testing soils and its color changes depending upon the reaction of the soils under test.

A further object is to provide an improved method of testing and applying such solution and color test.

Objects pertaining to details will definitely appear from the detailed description to follow. I accomplish the objects of the invention by the means described in the specification. The invention is clearly defined in the claims.

My testing solution is prepared by dissolving in neutral distilled water brom-thymol-blue dye powder in the proportion of 0.25 gram of the dye powder to one liter of water, and heating to a temperature of 70 to 80 degrees centigrade to facilitate solution. This solution should not be boiled. This acid dye solution should then be cooled to about 25 degrees centigrade, then adjusted to a hydrogen ion concentration (pH) of 6.9, using a saturated solution of calcium hydroxide as the neutralizing agent, and the hydrogen electrode as the end point indicator; or, in place of the hydrogen electrode, adjust the acid dye solution to a dark green color by adding the calcium hydroxide solution to it.

This method of preparation produces a solution of the calcium salt of brom-thymol-blue dye (calcium di-brom-thymol-sulphone-phthalein) very slightly acid in reaction due to the presence of a slight trace of unneutralized acid dye, and a solution in which the color changes may be readily observed when used for testing other acid or alkaline solutions or soils.

This solution provides an accurate and practical method for determining the reaction of soils based on the color changes produced by various concentrations of hydroxyl and hydrogen ions. This indicator solution is especially prepared and adjusted for testing soils, and its color changes depend on the reaction of the soils under test. In an alkaline (sweet) solution, the color of the indicator solution is blue. Near the neutral point a solution of the indicator is bluish green in color. In an acid (sour) solution its color changes from green, through yellowish green to yellow and finally orange yellow, depending on the strength or degree of acidity in the solution. These color changes of the indicator solution provide a means of determining the reaction of a soil, and particularly the strength of the acids in acid soils and, hence, the lime requirement.

A color chart should be provided for comparison, having blue for alkaline reaction, bluish green for neutral, green for slightly acid, yellowish green for medium acid, yellow for strongly acid, and orange yellow for very strongly acid reaction.

For field work the solution is used by manipulation with strips of white waxed paper, as follows: Fold a piece of the waxed paper lengthwise, hold one end in the left hand, and open paper to form a trough. With a knife blade place a small quantity of the soil to be tested (about the amount that may be held on a dime) loosely in the center of this paper trough. Drop the testing solution slowly and carefully on the end of the soil mass near the hand holding the paper until the soil becomes saturated with the solution. Let the soil stand for about one minute, then add a few drops more of the solution at the same place, and, with the knife blade, draw some of the liquid soil extract away from the other end of the soil mass and compare the color of this extract with the color chart in order to determine the degree of soil reaction and the recommended lime requirement.

Another method of performing the test is by use of a white dish, which affords a white porcelain background for the testing solution, thereby showing its color very nicely, the method being as follows: Wipe the dish with a clean cloth. With a clean knife blade, place a small amount of soil, about the quantity that may be held on a dime, on the center of the dish. Form the soil into a ring with the point of the knife blade. Drop the testing solution into the center of this ring, slowly, until the soil becomes saturated. Let stand for one-half to one minute. Add a drop or two more of the solution, and with the knife blade draw one or two drops of the clear soil extract away from the outer edge of the soil ring to a clear spot on the dish. Compare the color of this soil extract with the accompanying color chart for the soil reaction, or degree of acidity and limestone requirement. Throw soil from the dish and wipe dry with the cloth in preparation for the next test. Dry muck soils, and other soils not easily wet, should first be moistened by stirring with a few drops of the solution before applying the test as outlined.

Care should be taken to prevent contact of the soil being tested or the solution with anything that will cause contamination. A fresh strip of waxed paper should be used for each test. Wiping cloths for wiping dishes should not be soaped nor contaminated by washing compounds, but the dish should be cleaned with clear soft water.

The tests are very accurate and the colors give true indication of the extent particularly of acidity. In soils of the same class there is a general relationship between degree of acidity and quantity of active acids soils may contain, and by means of the test the lime requirement of a soil may be closely approximated provided the soil class is known.

Lime requirement as indicated by a color chart; that is, the tons of limestone recommended per acre, is as follows: For sands and mucks, for conditions slightly acid, $\frac{1}{2}$ to 1 ton; medium acid, 1 to $1\frac{1}{2}$ tons; strongly acid, $1\frac{1}{2}$ to 2 tons; and very strongly acid, 2 to 3 tons. For sandy loam, for conditions slightly acid, 1 to $1\frac{1}{2}$ tons; medium acid, $1\frac{1}{2}$ to 2 tons; strongly acid, 2 to $2\frac{1}{2}$ tons; and very strongly acid, $2\frac{1}{2}$ to $3\frac{1}{2}$ tons. For silt loams and clay loams, for conditions slightly acid, 1 to 2 tons; medium acid, 2 to $2\frac{1}{2}$ tons; strongly acid $2\frac{1}{2}$ to 3 tons, and very strongly acid, 3 to 4 tons.

The amounts of hydrated lime recommended for acid soils are about 75 per cent or three-fourths of those for limestone.

Soils absorb some of the dye solution and there should be sufficient left in solution to give the color reaction.

The calcium salt is a very important feature. Calcium salts of weak acids have very little reaction with the soil, while salts of strong alkali potassium and sodium react strongly with the soil.

The testing solution should be kept in containers which have been subjected to thorough neutralization and strictly at the neutral point to give sensitivity to the test.

Having thus described my invention, what I claim as new and desire to secure by Letters Patent is:

1. A solution for testing soils consisting of 0.25 gram of brom-thymol-blue dye dissolved in one liter of neutral distilled water, adjusted to predetermine hydrogen ion concentration by use of a saturated solution of calcium hydroxide as the neutralizing agent.

2. A solution for testing soils consisting of 0.25 gram of brom-thymol-blue dye dissolved in one liter of neutral distilled water, adjusted to a dark green color by adding thereto a saturated solution of calcium hydroxide as the neutralizing agent.

3. As a testing compound, a solution of calcium salt of brom-thymol-blue dye (calcium-di-brom-thymol-sulphone-phthalein) very slightly acid in reaction due to the presence of a slight trace of unneutralized acid dye, in which the color changes may be readily observed.

4. A method of testing soils consisting in placing the soil on a white surface, saturating the same with a testing solution of calcium salt of brom-thymol-blue dye, very slightly acid in its reaction due to a slight excess of said dye, permitting the same to react upon the soil for a minute, increasing the solution so that a portion can be drawn off on a white surface to inspect the color for comparison with a standard chart, as specified.

In witness whereof I have hereunto set my hand and seal.

CHARLES H. SPURWAY. [L. S.]